(12) United States Patent
Harada

(10) Patent No.: US 6,259,087 B1
(45) Date of Patent: *Jul. 10, 2001

(54) CALIBRATION APPARATUS FOR MULTI-ELEMENT SENSOR

(75) Inventor: Hisashi Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/189,350

(22) Filed: Nov. 10, 1998

(30) Foreign Application Priority Data

Nov. 11, 1997 (JP) .................................................... 9-308871

(51) Int. Cl.$^7$ ..................................................... H01J 40/14

(52) U.S. Cl. ..................... 250/214 R; 358/406; 358/482; 358/483; 250/208.1

(58) Field of Search ............................ 250/214 R, 208.1, 250/208.2; 358/406, 482, 483

(56) References Cited

U.S. PATENT DOCUMENTS

| | | | |
|---|---|---|---|
| 5,317,423 | * | 5/1994 | Harada ................................. 358/482 |
| 5,963,338 | * | 10/1999 | Harada ................................. 358/406 |

FOREIGN PATENT DOCUMENTS

| | | |
|---|---|---|
| 5-183143 | 7/1993 | (JP) . |
| 9-37022 | 2/1997 | (JP) . |

* cited by examiner

Primary Examiner—Que T. Le
Assistant Examiner—Thanh X. Luu
(74) Attorney, Agent, or Firm—Ostrolenk, Faber, Gerb & Soffen, LLP

(57) ABSTRACT

In a multi-element sensor calibration apparatus, an image signal derived from a multi-element sensor installed in a facsimile or a satellite is periodically calibrated based upon a zero level signal and a calibration signal having more than two uniform levels. The multi-element sensor calibration apparatus is arranged by employing a light reception unit for receiving incident light to convert the received incident light into an electric signal; a calibration signal output unit for outputting a calibration signal used to calibrate the electric signal; a transfer unit for transferring the electric signal and the calibration signal; a gate for executing a gating operation of the electric signal in such a manner that when the gate is set to an ON state, the electric signal derived from the light reception unit is outputted to the transfer unit whereas when the gate is set to an OFF state, outputting of the electric signal to the transfer unit is interrupted; and a calibration signal output control unit for performing output control of the calibration signal in such a way that when the gate means is set to an ON state, the calibration signal is not outputted to the transfer unit, whereas when the gate is set to an OFF state, the calibration signal is outputted to the transfer unit. As a result, the image signal of the multi-element sensor can be calibrated irrespective of the electrical differences in the solid-state characteristics of the electronic components.

8 Claims, 6 Drawing Sheets

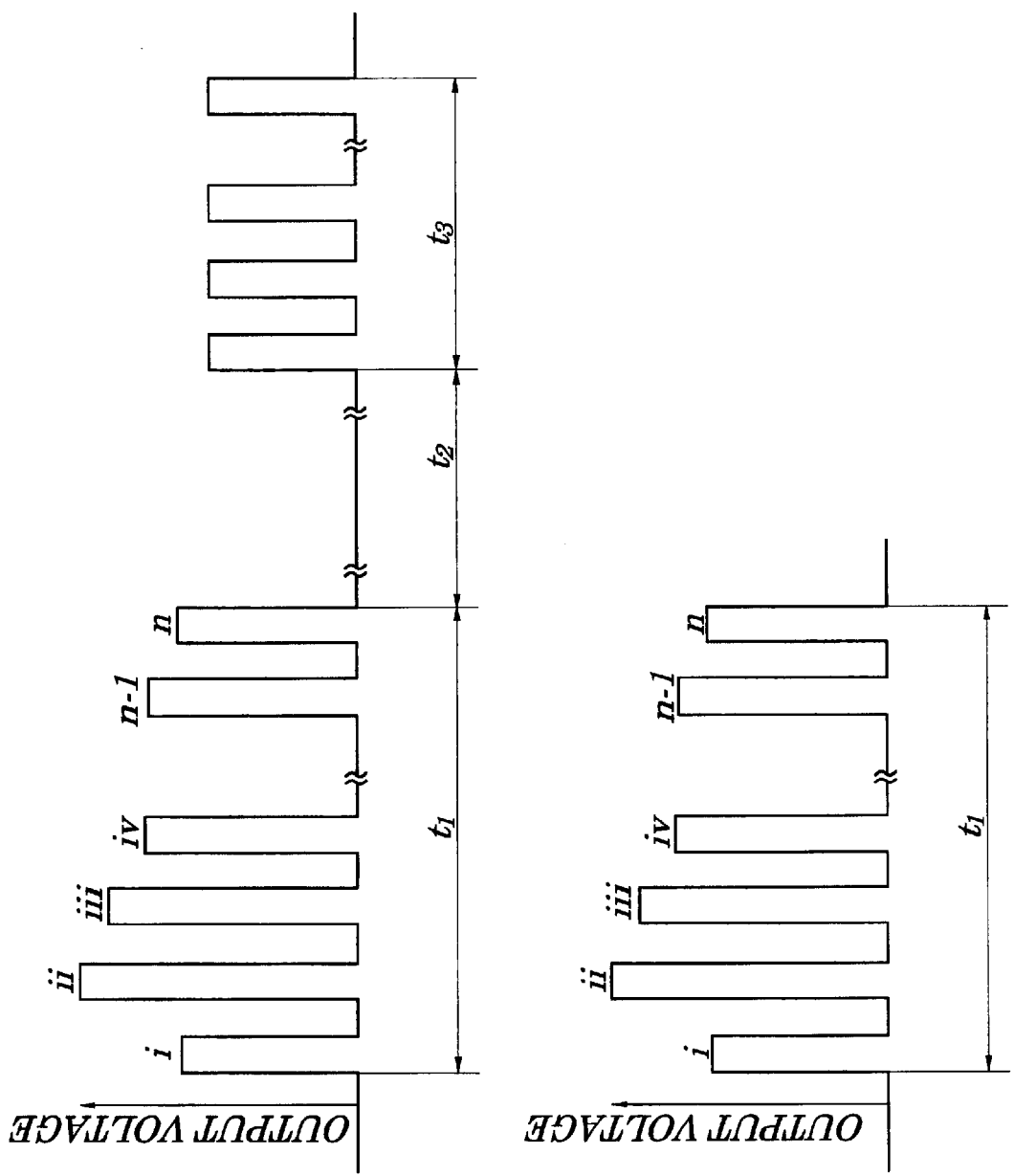
Fig. 7 (a) (PRIOR ART)
Fig. 7 (b) (PRIOR ART)

CALIBRATION APPARATUS FOR MULTI-ELEMENT SENSOR

BACKGROUND OF THE INVENTION

1. Field of the Invention

The present invention generally relates to a calibration apparatus used for a multi-element sensor. More specifically, the present invention is directed to such a calibration apparatus capable of calibrating a high-resolution multi-element sensor used to sense an optical image of a facsimile, or an earth-monitoring multi-element sensor installed on a satellite.

2. Description of the Related Art

Conventionally, a multi-element sensor installed in a facsimile, or a satellite may sense an image signal, and further is electrically calibrated so as to periodically confirm operation conditions of electronic circuitry employed in an entire system.

One typical multi-element sensor introduces the following electric calibration method. That is, while using two levels of signals, namely, a zero level signal and an electric calibration signal as a reference, the sensor signal is electrically calibrated.

FIG. 7 is a timing chart for the various signals related to the typical multi-element sensor with respect to the time sequential operation.

As shown in FIG. 7(a), an image signal is outputted from the multi-element sensor during a time period of "t1", either a zero level signal or an offset signal is outputted during a time period of "t2", and an electric calibration signal is outputted during a time period of "t3". The time period of "t2" succeeds the first-mentioned time period of "t1", and the time period of "t3" succeeds this time period of "t2".

Conventionally, the image signal outputted during the time period of "t1" is calibrated based upon both the zero level signal outputted during the time period of "t2" and the electric calibration signal outputted during the time period of "t3".

FIG. 7(b) is a timing chart for indicating an image signal which has been calibrated by employing the zero level signal and the electric calibration signal with respect to the time sequential operation.

This conventional calibration method is described in, for example, Japanese Patent Laid-open Publication Nos. Hei5-183143 and Hei9-37022.

On the other hand, in a multi-element sensor, a minus-offset may be set to a zero level signal in order to widen a dynamic range of this multi-element sensor. Also, a zero level of this multi-element sensor may be set and this set level exceeds a preselected sensitivity, since this sensor may detect a light amount higher than a preselected light level.

In this conventional sensor calibration technique, since the image signal is calibrated based upon the two levels of the zero level signal and the electric calibration signal, both the offset and the gain of this sensor can be hardly corrected.

Also, the conventional multi-element sensor calibration apparatus presents the following problem. That is, within the image signals outputted from the multi-element sensor whose elements are arranged in a linear manner, the image signal outputted from the even-numbered multi-element sensor and also the image signal outputted from the odd-numbered multi-element sensor pass through the different registers and the different amplifiers. Since the offset amounts of the respective registers and also the gains of the respective amplifiers are different from each other, there is a slight difference between the electrical characteristics of the image signal derived from the even-numbered multi-element sensor, and the electrical characteristics of the image signal derived from the odd-numbered multi-element sensor.

SUMMARY OF THE INVENTION

The present invention has been made to solve the above-described problems, and therefore, has an object to provide a multi-element sensor calibration apparatus capable of continuously calibrating the multi-element sensor irrespective of solid-state characteristic differences produced in registers and also amplifiers, through which image signals of this multi-element sensor pass.

To achieve the above-described object, a calibration apparatus used for a multi-element sensor, according to an aspect of the present invention, is featured by comprising:

a light reception unit for receiving incident light to convert the received incident light into an electric signal;

calibration signal output means for outputting a calibration signal used to calibrate the electric signal;

transfer means for transferring the electric signal and the calibration signal;

gate means for executing a gating operation of the electric signal in such a manner that when the gate means is set to an ON state, the electric signal derived from the light reception unit is outputted to the transfer means whereas when the gate means is set to an OFF state, outputting of the electric signal to the transfer means is interrupted; and calibration signal output control means for performing an output control of the calibration signal in such a way that when the gate means is set to an ON state, the calibration signal is not outputted to the transfer means, whereas when the gate means is set to an OFF state, the calibration signal is outputted to the transfer means.

Also, according to another aspect of the present invention, adjustment means for adjusting a level of the calibration signal is provided between the transfer means and the calibration signal output control means.

Also, according to another aspect of the present invention, amplification means for amplifying the electric signal and the calibration signal, which are transferred by the transfer means, is provided at a post stage of the transfer means.

Also, according to another aspect of the present invention, the light reception unit includes a plurality of optical sensors;

the multi-element sensor calibration apparatus includes at least two sets of each of the calibration signal output means, the transfer means, the gate means, and the calibration signal output control means; and the two sets of gate means are arranged in correspondence with a respective portion of the plurality of optical sensors.

Further, according to another aspect of the present invention, the multi-element sensor calibration apparatus is featured by further comprising:

at least two sets of adjustment means for adjusting a level of the calibration signal and positioned between the respective calibration signal output control means and the respective transfer means.

Further, according to another aspect of the present invention, the multi-element sensor calibration apparatus is featured by further comprising:

at least two sets of amplification means for amplifying the electric signals and the calibration signals, which are transferred by the at least two sets of transfer means, positioned at post stages of the respective transfer means, respectively.

Also, according to another aspect of the present invention, the calibration signal derived from the calibration signal output means has at least two uniform levels.

Also, according to another aspect of the present invention, the gate means and the calibration signal output control means are controlled to substantially simultaneously output the electric signal and the calibration signal.

Also, according to another aspect of the present invention, the electric signal contains at least an image signal and a zero level signal.

Also, according to another aspect of the present invention, the electric signal contains at least an image signal and an offset signal.

BRIEF DESCRIPTION OF THE DRAWINGS

The above and other objects, advantages and features of the present invention will be more apparent from the following description taken in connection with the accompanying drawings, in which:

FIG. 7 is a timing chart for representing the time sequential variations in the signals of the conventional multi-element sensor.

DETAILED DESCRIPTION OF THE PREFERRED EMBODIMENTS

Figure 1:
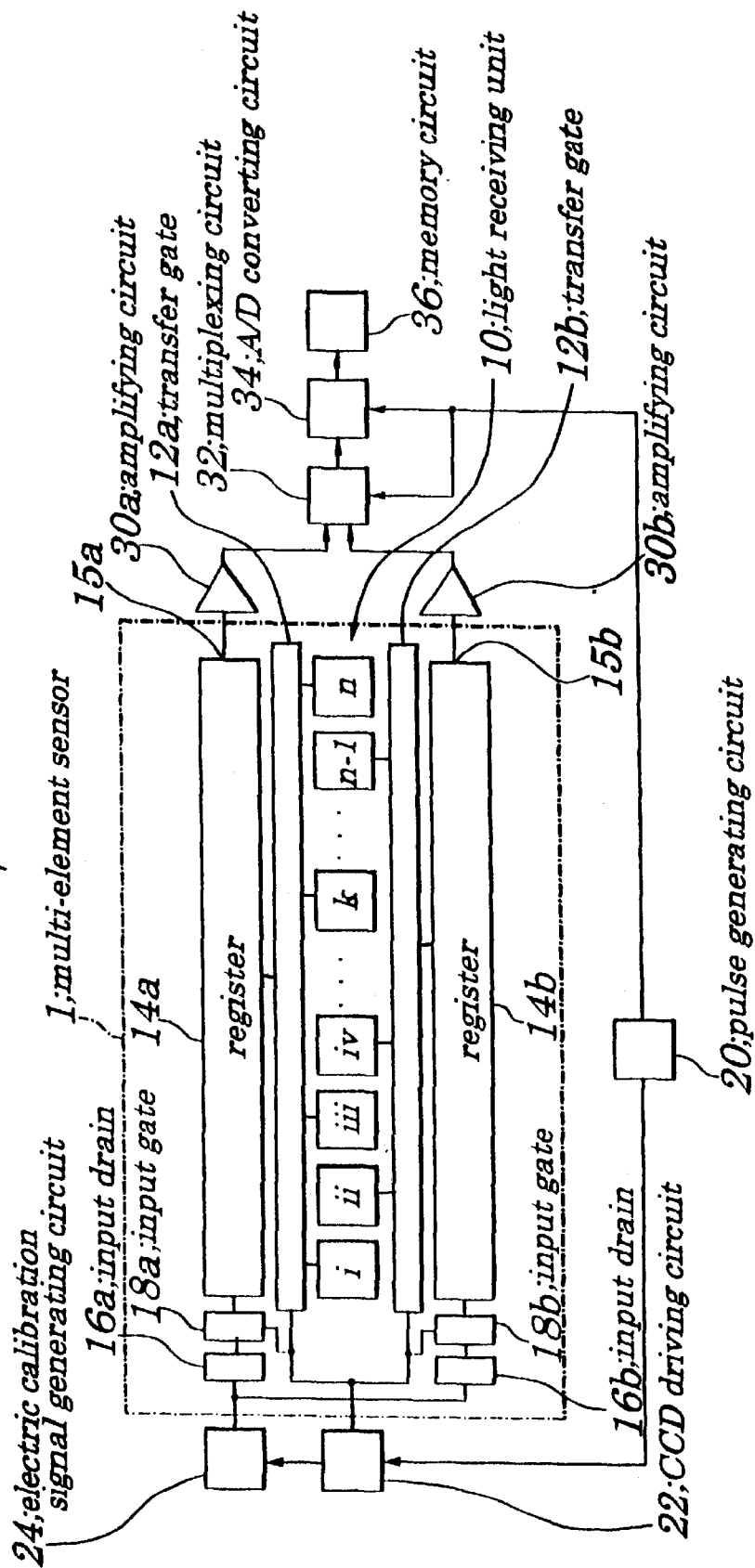
FIG. 1 is a schematic diagram for representing a circuit arrangement of a multi-element sensor calibration apparatus 100 according to an embodiment of the present invention.

Referring now to the drawings, a calibration apparatus capable of calibrating a multi-element sensor, according to an embodiment of the present invention, will be described in detail.

FIG. 1 is a schematic block diagram for indicating a circuit arrangement of a multi-element sensor calibration apparatus 100 according to an embodiment of the present invention.

In FIG. 1, reference numeral 1 shows a multi-element sensor. This multi-element sensor 1 includes the structure described below.

First, the structure of this multi-element sensor 1 will now be explained. Reference numeral 10 shows a light receiving unit for converting incident light into an electric (image) signal. As indicated in FIG. 1, this light receiving unit 10 is constituted by "n" pieces of optical sensors "i" to "n".

Reference numerals 12a and 12b show transfer gates. These transfer gates 12a and 12b are arranged along the light receiving unit 10 in such a way that this light receiving unit 10 is sandwiched by the transfer gate 12a and the transfer gate 12b. These transfer gates 12a and 12b are employed so as to supply only a signal outputted from a specific light receiving unit among the signals derived from the light receiving unit 10 to registers 14a and 14b (which will be discussed later). The transfer gates 12a and 12b may specify the optical sensors "i" to "n" of the light receiving unit 10 in different time sequential manner.

Also, reference numerals 14a and 14b indicate registers. These registers 14a and 14b are arranged in such a manner that both the light receiving unit 10 and the transfer gates 12a/12b are sandwiched by these registers 14a and 14b. The registers 14a and 14b are provided so as to transfer the signals outputted from the transfer gates 12a and 12b to output edge portions 15a and 15b of these registers 14a and 14b, and then output these transferred signals from these output edge portions 15a and 15b. Also, the registers 14a and 14b transfer calibration signals derived from input drains 16a and 16b to the output edge portions 15a and 15b, and then output these calibration signals from these output edge portions 15a and 15b, respectively.

Reference numerals 16a and 16b indicate input drains provided at edge portions of the registers 14a and 14b, which are different from the above-explained output edge portions 15a and 15b thereof. When the input drains 16a and 16b are set at ON states, the input drains 16a/16b enter the electric calibration signals unto the registers 14a and 14b, respectively.

Reference numeral 18a shows an input gate provided between the input drain 16a and the register 14a, and reference numeral 18b indicates another input gate provided between the input drain 16b and the register 14b. These input gates 18a and 18b are employed so as to adjust the input levels of the electric calibration signals derived from the input drains 16a and 16b.

The above-explained structural elements constitute the internal arrangement of the multi-element sensor 1.

Next, an internal circuit arrangement of the calibration apparatus 100 capable of calibrating the above-described multi-element sensor 1 will now be described.

Referring back to FIG. 1, reference numeral 20 shows a pulse generating circuit for generating a timing pulse used to define the timing of the calibration apparatus 100. This pulse generating circuit 20 is connected to a CCD driving circuit 22, a multiplexing circuit 32, and an A/D converting circuit 34 (which will be explained later).

The CCD (charge-coupled device) driving circuit 22 is connected to the above-explained transfer gates 12a, 12b and the above-described input gates 18a, 18b of the multi-element sensor 1. This CCD driving circuit 22 produces a CCD drive pulse so as to drive the transfer gates 12a, 12b and the registers 14a, 14b.

Also, the CCD driving circuit 22 is connected to an electric calibration signal generating circuit 24. This electric calibration signal generating circuit 24 generates an electric calibration signal in synchronism with the CCD drive pulse outputted from the CCD driving circuit 22. This electric calibration signal generating circuit 24 is connected to the above-described input drains 16a and 16b, and then outputs the electric calibration signal via these input drains 16a and 16b to the registers 14a and 14b.

Also, the output edge portions 15a and 15b of the above-described registers 14a and 14b are connected to amplifying circuits 30a and 30b. These amplifying circuits 30a and 30b amplify the signals outputted from the output edge portions 15a and 15b. Output terminals of the amplifying circuits 30a and 30b are connected to the multiplexing circuit 32.

The multiplexing circuit 32 synthesizes the signal outputted from one amplifying circuit 30a with the signal outputted from the other amplifying circuit 30b in synchronism with the timing pulse outputted from the pulse generating circuit 20.

Since the signals outputted from the amplifying circuits 30a and 30b are equal to such signals produced by amplifying the signals transferred through the registers 14a and 14b, these output signals contain an image signal, a zero level signal, and an electric calibration signal.

Reference numeral 34 indicates an A/D (analog-to-digital) converting circuit for converting an analog signal derived from the multiplexing circuit 32 into a digital signal in synchronism with the timing pulse outputted from the pulse generating circuit 20.

Furthermore, reference numeral 36 indicates a memory circuit for storing thereinto the digital signal outputted from the A/D converting circuit 34. The digital signal stored in the memory circuit 36 is employed in order to correct a sensitivity of the multi-element sensor 1 and offset thereof. Next, a description will now be made of the operation of the calibration apparatus 100 for calibrating the multi-element sensor 1, using of the above-described circuit arrangement, according to an embodiment of the present invention.

First, in FIG. 1, the pulse generating circuit 20 generates the timing pulse used to define the operation timing of the calibration apparatus 100 for calibrating the multi-element sensor 1. This timing pulse is outputted to the CCD driving circuit 22, the multiplexing circuit 32, and the A/D converting circuit 34.

Next, when light is irradiated onto the light receiving unit of the multi-element sensor 1, the irradiated light is photo-electrically converted into an electric signal. Then, this electric signal converted by the light receiving unit 10 is transferred to either the register 14a or the register 14b when either the transfer gate 12a or the transfer gate 12b is brought into the ON state. After either the transfer gate 12a or the transfer gate 12b is brought into the OFF state, this photoelectrically-converted signal is successively transferred to either the output edge portion 15a or the output edge portion 15b in synchronism with the transfer clock signal outputted from the CCD driving circuit 22. Then, this transferred signal is outputted to the amplifying circuit 30a, 30b.

Figure 2:
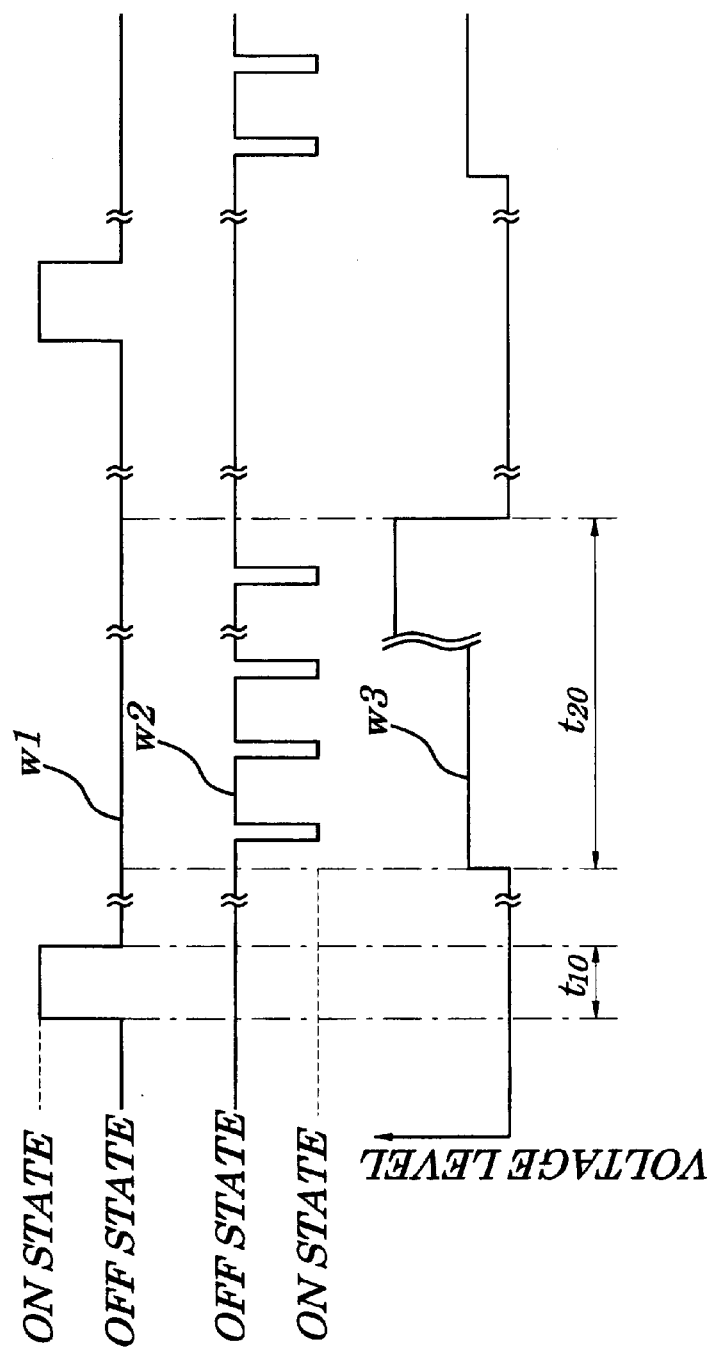
FIG. 2 is a timing chart for showing time sequential variations in operations of transfer gates 12a/12b, input drains 16a/16b, and input gates 18a/18b of the multi-element sensor indicated in FIG. 1.

FIG. 2 is a timing chart for representing time-sequential operation states of the transfer gates 12a, 12b; the input drains 16a, 16b; and the input gates 18a, 18b.

It should be noted that a signal waveform indicated by symbol "W1" represents time-sequential operation changes of the transfer gates 12a and 12b; another signal waveform indicated by symbol "W2" represents time-sequential operation changes of the input drains 16a and 16b; and another signal waveform indicated by symbol "W3" indicates time-sequential operation changes of the input gates 18a and 18b.

When the transfer gates 12a and 12b are set to the ON states (namely, time period indicated by symbol "t10"), both the input drains 16a and 16b are set to the OFF states. After the transfer gates 12a and 12b are brought into OFF states, the clock signal is transferred through several stages. Thereafter, the input drains 16a and 16b are ON/OFF-controlled to enter the electric calibration signal to the registers 14a and 14b (namely, time period indicated by symbol "t20"). The input gates 18a and 18b may change the input level of the electric calibration signal by changing the voltage levels.

In other words, in accordance with this embodiment, when the image signal is entered into either the register 14a or the register 14b, both the input drain 16a and the input drain 16b are brought into the OFF states so that the electric calibration signal is not entered from the input drain 16a, or 16b into the register 14a, or 14b.

On the other hand, in the case that the electric calibration signal is entered into the registers 14a and 14b, as indicated in FIG. 2, the input drains 16a and 16b are repeatedly ON/OFF-controlled, and when the input drains 16a and 16b are set to the ON states, the electric calibration signal is entered into the registers 14a and 14b. At this time, the transfer gates 12a and 12b are set to the OFF states so that the image signal passes through the transfer gates 12a and 12b and thereafter are not entered into the registers 14a and 14b.

It should be understood that when the voltages of the input gates 18a and 18b are changed, the input level of the electric calibration signal may be changed. As a consequence, the sensitivity of the image signal and the offset of this image signal can be calibrated while using more than two levels of the calibration signal and of the zero level signal as the references.

The electric calibration signal is inputted from the input drains 16a and 16b, and then is successively transferred in accordance with the transfer clock signal to be supplied to the amplifying circuits 30a and 30b by performing the control method discussed below. That is, this control is carried out in such a manner that when the electric signal outputted from the light receiving unit is transferred through several stages of either the register 14a or the register 14b, while the above-explained transfer operation is carried out, the ON/OFF states of either the input drain 16a or the input drain 16b are periodically switched.

When the electric calibration signal is entered into the registers 14a and 14b, the input level of the electric calibration signal may be adjusted by the input gates 18a and 18b.

The image signals having very low levels transferred by the registers 14a and 14b are amplified by the amplifying circuits 30a and 30b. The image signal amplified by the amplifying circuit 30a is synthesized with the image signal amplified by the amplifying circuit 30b in the multiplexing circuit 32. The image signal synthesized by the multiplexing circuit 32 is supplied to the A/D converting circuit 34 so as to be converted into a digital image signal. It should also be noted that the image signals transferred by the registers 14a and 14b contain the zero level signal and the electric calibration signal.

This digital image signal is stored into the memory circuit 36, and then the stored digital image signal is used to correct the sensitivity of the image signal and the offset of this image signal.

Figure 3:
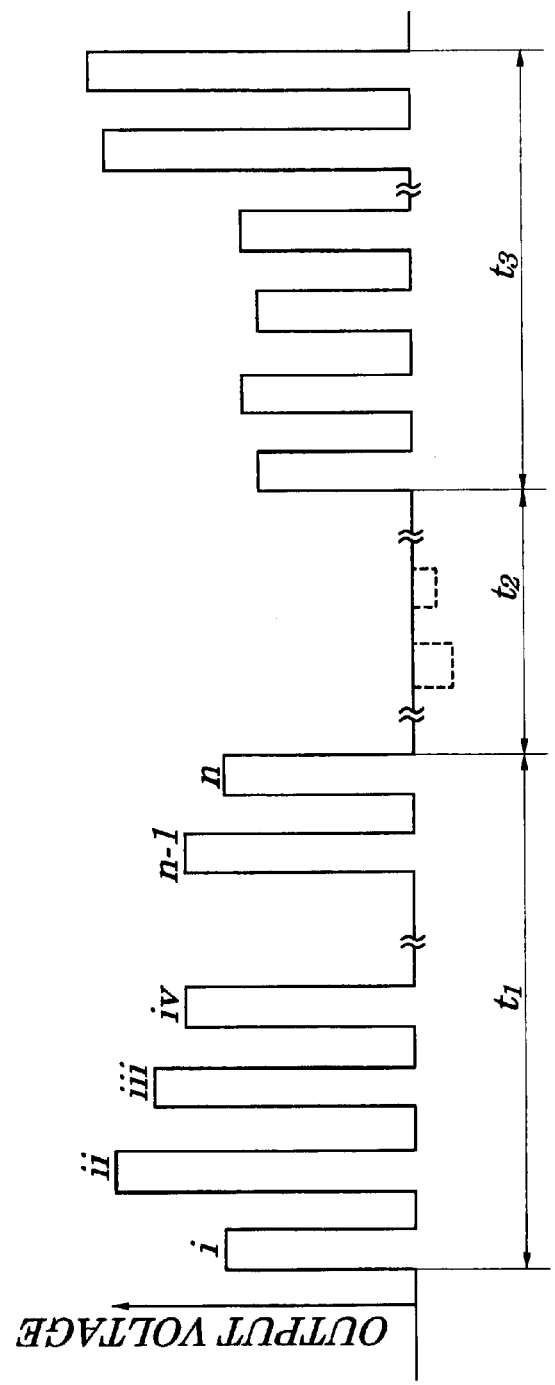
FIG. 3 is a timing chart for representing time-sequential output states of an image signal, a zero level signal, and an electric calibration signal, which are outputted from the multiplexing circuit 32 of the calibration apparatus 100 under a stable temperature condition.

FIG. 3 is a timing chart for representing time-sequential output states of an image signal, a zero level signal, and an electric calibration signal, which are outputted from the multiplexing circuit 32 of the calibration apparatus 100 under a stable temperature condition.

As shown in FIG. 3, the image signal is outputted from the multi-element sensor 1 during a time period of "t1", either the zero level signal or the offset signal is outputted during a time period of "t2", and the electric calibration signal is outputted during a time period of "t3". The time period of "t2" succeeds the first-mentioned time period of "t1", and the time period of "t3" succeeds this time period of "t2".

In this drawing, the ordinate represents an output voltage, and the abscissa denotes time.

As indicated in this drawing, the image signals having the various levels are outputted, depending upon the imaging objects, whereas the electric calibration signals have more uniform levels, with the even-numbered electric calibration signals being different from the odd-numbered electric calibration signals, depending on the solid-state characteristic differences of the registers and the amplifying circuits.

Figure 4:
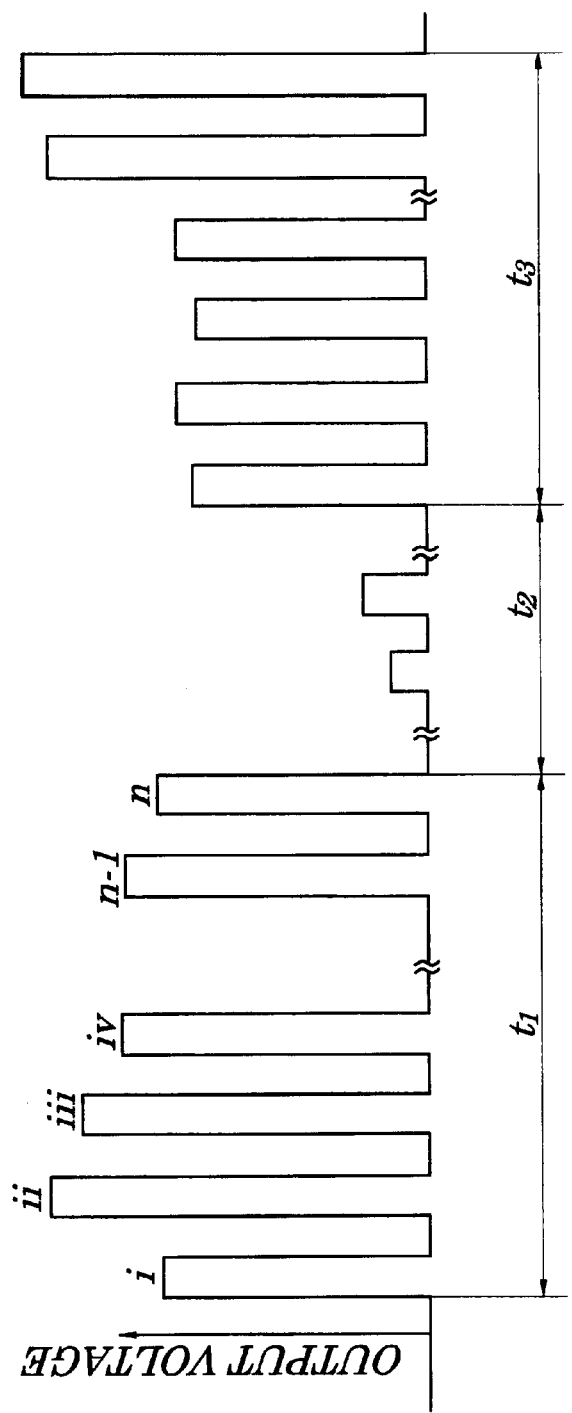
FIG. 4 is a timing chart for representing time-sequential output states of an image signal, a zero level signal, and an electric calibration signal, which are outputted from the multiplexing circuit 32 of the calibration apparatus 100 under a variable temperature condition.

Next, a description will now be made of signals outputted from the multiplexing circuit 32 in the case that the level of the image signal is varied due to temperature variations. FIG. 4 is a timing chart for representing time-sequential output states of an image signal, a zero level signal, and an electric calibration signal, which are outputted from the multiplexing circuit 32 of the calibration apparatus 100 an unstable temperature condition. Similar to FIG. 3, in FIG. 4, the image signal is outputted from the multi-element sensor 1 during a time period of "t1", either the zero level signal or the offset signal is outputted during a time period of "t2", and the electric calibration signal is outputted during a time period of "t3". The time period of "t2" succeeds the first-mentioned time period of "t1", and the time period of "t3" succeeds this time period of "t2".

In this drawing, the ordinate represents an output voltage, and an abscissa denotes time.

As indicated in FIG. 4, even when the image signal is varied due to the temperature variations occurred in the CCD circuit unit, both the zero level (or offset level) of the image signal and the gain of this image signal can be corrected while using the zero level signal and the electric calibration signals having more than two levels as the reference values.

Figure 5:
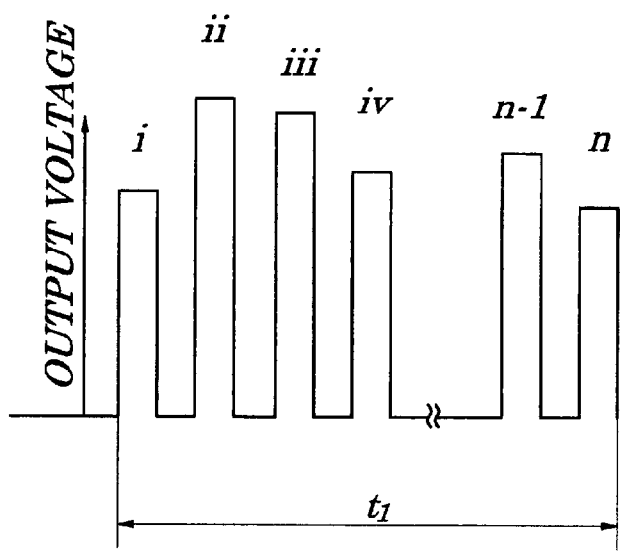
FIG. 5 schematically shows an image signal calibrated by the calibration apparatus 100 during temperature variations.

Also, as to shifts in the offset and the gain, and also the minus offset component, as indicated in FIG. 5, the image signal for one line may be simply corrected. These shifts are caused by the solid-state differences, since the different registers 14a/14b and the different amplifying circuits 30a/30b are employed. FIG. 5 indicates the calibrated image signals in a case in which the temperature is varied.

Figure 6:
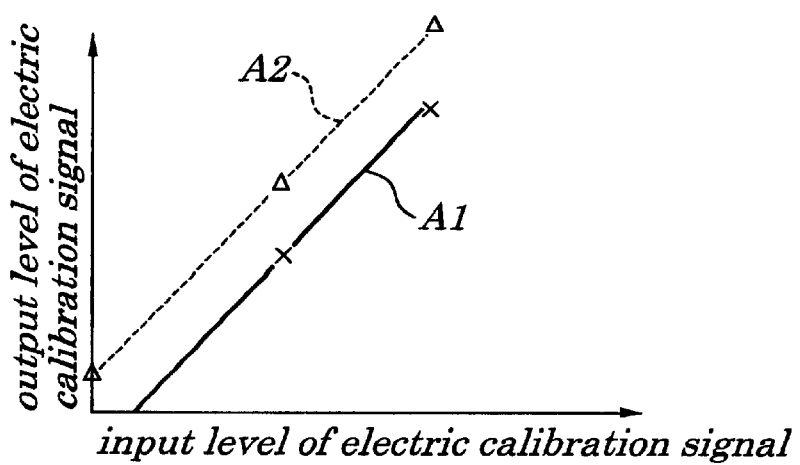
FIG. 6 graphically indicates a relationship between an input level of an electric calibration signal used in the calibration apparatus 100 and an output level thereof.

FIG. 6 graphically shows a relationship between an input level of an electric calibration signal and an output level thereof. In this graphical representation, the straight line indicated by symbol "A1" corresponds to a relationship between an input level of an electric calibration signal and an output level thereof under a stable temperature condition. Also, another straight line indicated by symbol "A2" corresponds to a relationship between an input level of an electric calibration signal and an output level thereof under an unstable temperature condition.

In other words, when the signal level of the image signal is varied in response to the temperature changes, since the signal level of the electric calibration signal is also varied, the electric calibration can be carried out.

As previously described, in accordance with this embodiment, as indicated in FIG. 3, as the output signal derived from the register for one time period, after the image signal having the various signal levels is outputted in accordance with the imaging objects, the zero level (otherwise offset) signal is outputted from this register. Immediately after this zero level signal, one set of the electric calibration signal having a plurality of uniform levels is outputted from the register. In FIG. 3, this electric calibration signal has two uniform levels.

As a consequence, even when these images such as the image signal, the zero level signal, and the electric calibration signal pass through the registers 14a and 14b having the different solid-state characteristics, and further the amplifying circuits 30a and 30b having different solid-state characteristics, the calibration can be easily carried out.

The multi-element sensor calibration apparatus according to this embodiment can achieve the following effects.

As the first effect, even when the below-mentioned electrical characteristics of the electronic components are varied, the image signals derived from the multi-element sensor can be continuously corrected, or calibrated. For instance, the signal levels of the image signals change due to temperature changes. Also, the levels and the gains of the zero level signals (otherwise, offset signals) are different from each other depending upon the odd-numbered pixels and the even-numbered pixels, because of the solid-state electrical characteristic differences in two sets of registers and amplifying circuits.

The reason why the image signals can be continuously corrected is given as follows: while the transfer gate is turned ON, the image signal of the multi-element sensor is entered into the register, whereas while the transfer gate is turned OFF, the electric calibration signal is entered from the input drain via the input gate to the register. As a result, the image signal, the electric calibration signal, and the zero level (offset) signal can be outputted for one time period.

As a second effect, even when the zero level (offset) signal is offset to the minus level, the image signal of the multi-element sensor can be corrected.

This is because when more than 3 levels of the image signals are corrected, the minus offset component can be detected.

While the multi-element sensor calibration apparatus of the present invention has been described in detail, when the gate means is set to the ON state, the image signal is entered into the transfer means of the multi-element sensor, whereas when the gate means is set to the OFF state, the calibration signal is outputted from the calibration signal output control means to the transfer means. Since the electric signals containing the image signal and the zero level (offset) signal, and further the calibration signal are outputted at the same time, even when there is a temperature variation, the image signal outputted from the light receiving unit of the multi-element sensor can be corrected.

It is thus apparent that the present invention is not limited to the above embodiments but may be changed and modified without departing from the scope and spirit of the invention.

Finally, the present application claims the priority of Japanese Patent Application No. Hei9-308871 filed Nov. 11, 1997, which is herein incorporated by reference.

What is claimed is:

1. A multi-element sensor calibration apparatus comprising:
   a light reception unit for receiving incident light to convert the received incident light into an electric signal;
   a calibration signal output unit for outputting a calibration signal used to calibrate said electric signal;
   a transfer unit for transferring said electric signal and said calibration signal, said transfer unit extending substantially the full length of said light reception unit;
   a gate for executing a gating operation of said electric signal in such a manner that when said gate is set to an ON state, said electric signal derived from said light reception unit is outputted to said transfer unit whereas when said gate is set to an OFF state, outputting of said electric signal to said transfer unit is interrupted;

a calibration signal output control unit for performing output control of said calibration signal in such a way that when said gate is set to the ON state, said calibration signal is not outputted to said transfer unit, whereas when said gate is set to the OFF state, said calibration signal is outputted to said transfer unit; and an adjustment unit for adjusting a level of said calibration signal provided between said transferring and said calibration signal output control unit.

2. A multi-element sensor calibration apparatus according to claim 1, further comprising:

an amplification unit for amplifying said electric signal and said calibration signal, which are transferred by said transfer unit, provided at a post stage of said transfer unit.

3. A multi-element sensor calibration apparatus according to claim 1, wherein:

said light reception unit includes a plurality of optical sensors;

said multi-element sensor calibration apparatus includes at least two sets of each of said calibration signal output unit, said transfer unit, said gate, said calibration signal output control unit, and said adjustment unit; and said two sets of gates are arranged in correspondence with a respective portion of said plurality of optical sensors.

4. A multi-element sensor calibration apparatus according to claim 3, further comprising:

at least two sets of amplification units for amplifying said electric signals and said calibration signals, which are transferred by said at least two sets of transfer units, positioned at post stages of said respective transfer units, respectively.

5. A multi-element sensor calibration apparatus according to claim 1, wherein:

said calibration signal derived from said calibration signal output unit has at least two uniform levels.

6. A multi-element sensor calibration apparatus according to claim 1, wherein:

said gate and said calibration signal output control unit are controlled such that said electric signal and said calibration signal are outputted from said transfer means for one time period.

7. A multi-element sensor calibration apparatus according to claim 1, wherein:

said electric signal contains at least an image signal and a zero level signal.

8. A multi-element sensor calibration apparatus according to claim 1, wherein:

said electric signal contains at least an image signal and an offset signal.

\* \* \* \* \*